United States Patent [19]

Tada

[11] Patent Number: 5,736,991
[45] Date of Patent: Apr. 7, 1998

[54] ANIMATION EDITING APPARATUS

[75] Inventor: Atsuko Tada, Kawasaki, Japan

[73] Assignee: Fujitsu Limited, Kawasaki, Japan

[21] Appl. No.: 630,932

[22] Filed: Apr. 5, 1996

Related U.S. Application Data

[63] Continuation of Ser. No. 194,493, Feb. 10, 1994, abandoned.

[30] Foreign Application Priority Data

Mar. 17, 1993 [JP] Japan ................... 5-057530
Oct. 13, 1993 [JP] Japan ................... 5-256012

[51] Int. Cl.$^6$ ........................ G06T 15/70
[52] U.S. Cl. ............. 345/474; 345/430; 345/425
[58] Field of Search ............... 395/119–132, 173–175, 395/949–960; 345/122, 149; 382/276, 282

[56] References Cited

U.S. PATENT DOCUMENTS

| | | | |
|---|---|---|---|
| 4,645,459 | 2/1987 | Graf et al. | 395/126 X |
| 4,821,214 | 4/1989 | Sederberg | 395/120 |
| 4,935,879 | 6/1990 | Ueda | 395/130 |
| 4,949,286 | 8/1990 | Ohba | 395/125 |
| 5,175,808 | 12/1992 | Sayre | 395/133 |
| 5,204,944 | 4/1993 | Wolberg | 395/127 |
| 5,230,039 | 7/1993 | Grossman et al. | 395/130 |
| 5,255,352 | 10/1993 | Falk | 395/125 |
| 5,261,041 | 11/1993 | Susman | 395/152 |
| 5,287,446 | 2/1994 | Williams et al. | 395/152 |
| 5,325,480 | 6/1994 | Rice | 395/152 |
| 5,398,308 | 3/1995 | Kato et al. | 395/133 |

OTHER PUBLICATIONS

Cover et al., "Interactively deformable models for surgery simulation", IEEE Computer Graphics and Applications Magazine, v. 13, n. 6, pp. 68–75, Nov. 1993.
Wang et al, "Physically–based surface modeling using flexible wire frames", System Sciences, 1991 Annual Hawaii Int'l Conference, IEEE, vol. 1, pp. 661–670, 1991.
Foley et al, *Computer Graphics: Principles and Practice*, 2d edition, 1990, pp. 741–744, 1042–1043, 1057–1081, plate IV. 17.

*Primary Examiner*—Joseph H. Feild
*Attorney, Agent, or Firm*—Nikaido, Marmelstein, Murray & Oram LLP

[57] ABSTRACT

An animation editing apparatus is adapted to make an animation based on shape data related to a shape of an object. The animation editing apparatus is provided with a deforming processor for deforming the object based on an input instruction which specifies deformation of the object, a first attribute editor for editing at least an attribute of the object, a moving path editor for editing a moving path of the object, a storage for storing data used for making the animation, and a second attribute editor for automatically determining an attribute of a deformed object based on deformed shape data received from the deforming process means, where the deformed shape data are related to the shape of the deformed object.

13 Claims, 17 Drawing Sheets

F I G. 4
| DATA NAME | SPHERE O1 |
|---|---|
| SHAPE | INCLUDE VERTEX COORDINATES OF RECTANGULAR MESHES IN 2 DIMENSIONAL ARRANGEMENT |
| ATTRIBUTE | INCLUDE COLORS OF VERTEXES IN 2 DIMENSIONAL ARRANGEMENT |
F I G. 5
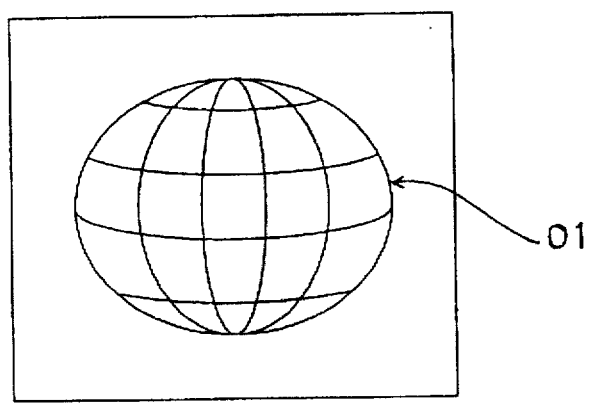

F I G. 8

| TYPE OF OBJECT | CHANGE OF ATTRIBUTE AFTER DEFORMATION |
|---|---|
| METAL | NONE |
| RUBBER | CHANGE SURFACE COLOR DEPENDING ON AREA |
| ... | ... |

F I G. 9

| DATA NAME | SPHERE 01 |
|---|---|
| TYPE OF OBJECT | RUBBER |
| SHAPE | INCLUDE VERTEX COORDINATES OF RECTANGULAR MESHES IN 2 DIMENSIONAL ARRANGEMENT |
| ATTRIBUTE | INCLUDE COLORS OF VERTEXES IN 2 DIMENSIONAL ARRANGEMENT |

| DATA NAME | CYLINDER  O2 |
|---|---|
| SHAPE | INCLUDE VERTEX COORDINATES OF RECTANGULAR MESHES IN  2 DIMENSIONAL ARRANGEMENT |
| NORMAL VECTOR | INCLUDE NORMAL VECTORS AT VERTEXES OF RECTANGULAR MESHES IN  2 DIMENSIONAL ARRANGEMENT |

F I G. 1 3
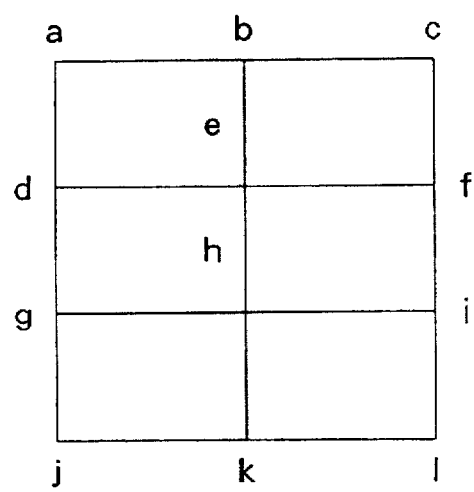

FIG. 16

| a' | b' |
|----|----|
| c' | d' |
| e' | f' |

ANIMATION EDITING APPARATUS

This application is a continuation of application Ser. No. 08/194,493 filed Feb. 10, 1994 abandoned.

BACKGROUND OF THE INVENTION

The present invention generally relates to animation editing apparatuses, and more particularly to an animation editing apparatus which makes animation by computer graphics or the like.

Recently, computer graphics which make and process graphics and images using a computer are used in various fields. Computer animation in particular is widely used in fields such as construction, commercial film, education and design.

In animation, it is necessary to edit an extremely large number of images. By processing such large number of images by use of the computer, it is possible to greatly reduce the time required to make the animation.

In addition, a more flexible and large scale editing process becomes possible in computer animation by use of an animation editing apparatus which can arbitrarily change the attributes and shapes of objects forming the image.

Accordingly, there are demands to realize an animation editing apparatus which can effectively carry out the process of changing the attributes and shapes of the objects.

In general, the animation editing apparatus which makes the animation by computer graphics or the like is provided with a function of deforming the shapes of the objects, a function of editing the attributes of the objects, a function of editing moving paths of the objects and the like. For example, the attributes of the objects include the surface color of the object, the pattern of the object, and the unevenness of the object. Using such various functions, the animation editing apparatus can make various animations such as an animation of a bouncing ball and an animation of a stretching chewing gum. In such cases, the shape of the ball changes when it bounces and the shape of the chewing gum changes when it is stretched. Such changes are hereinafter be referred to as the change in the shape of the object.

When making or editing the animation of the object which changes the shape, an editor (operator) instructs the animation editing apparatus from an input device to change the shape of the object. In response to this instruction, the animation editing apparatus carries out a process of changing the shape of the object by using the function of changing the shape of the object. As a result, the shape of the object changes in the animation.

When the shape of the object changes as described above, the attribute of the object may also change. If a red ball is taken as an example of the object, the surface of the ball contracts when the ball hits the ground during the bouncing motion. In this case, the color which is an attribute changes from red to a darker red. On the other hand, as the ball bounces up from the ground, the surface of the ball expands, and the color which is the attribute changes to a lighter red. Similarly, in the case of a dark green chewing gum, the color which is an attribute changes from dark green to a lighter green as the chewing gum is stretched.

Accordingly, the attribute of the object may change before and after the object is deformed. Conventionally, the change of the attribute accompanying the deformation of the object is instructed by the editor (operator) from the input device by carrying out an input process.

On the other hand, as one of the animation editing techniques, there is the so-called mapping process. The mapping process can put design, unevenness and the like on the object surface, as the attributes of the object. The technique for putting the design or the like on the object surface is called mapping. By carrying out the mapping process with respect to an object having a simple shape, it becomes possible to describe more complex shapes and more complex patterns. For this reason, the mapping process is the main technique used in the computer graphics.

FIG. 1 is a diagram for explaining the concept of the mapping process. In FIG. 1, a texture map A is given a texture (or pattern), and the texture is to be put on an object B. By carrying out the mapping process, it is possible to easily obtain a mapped object C which is put on with the texture of the texture map A. As a particular example of the mapping process, a point on the texture map A associated with a certain point on the object B is obtained, and the color at the point on the texture map A is displayed as the color of the object at the certain point.

And, as described above, the deformation of the object is frequently used when making the animation. For this reason, the mapped object is also often deformed. For example, the mapped object C shown in FIG. 1 may be deformed by stretching it in the vertical direction so as to obtain a deformed object D.

When making (or editing) the animation in which the shape of the object which is already subjected to the mapping process is deformed, the editor instructs the animation editing apparatus to change the shape of the object from the input device. In response to this instruction, the animation editing apparatus carries out the process of changing the shape of the object by using the function of changing the shape of the object. As a result, the shape of the object changes in the animation.

The attribute of the object may change when the shape of the object changes, as described above. But conventionally, the change of the attribute accompanying the deformation of the object which is already subjected to the mapping process is also instructed by the editor (operator) by carrying out the input process from the input device with respect to the animation editing apparatus.

Hence, the conventional animation editing apparatus was designed to change the shape of the object and to change the attribute of the object independently. For this reason, when editing the animation of the object which deforms, the object will be described with the original attribute (the original color in the examples given above) even after the object is deformed if the process of changing the shape is simply carried out.

Therefore, when describing by the animation the objects such as rubber and cloth whose attributes change when the objects are stretched, contracted and the like, the conventional animation editing apparatus first changes the shape of the object and then sets the attribute to suit the change. However, the setting of the attribute is made on a trial-and-error basis by predicting the change in the attribute depending on the change of the shape. As a result, there was a problem in that the operation efficiency of the animation editing process is poor.

SUMMARY OF THE INVENTION

Accordingly, it is a general object of the present invention to provide a novel and useful animation editing apparatus in which the problem described above is eliminated. More particularly, the general object of the present invention is to improve the operation efficiency of the animation editing process.

Another and more specific object of the present invention is to provide an animation editing apparatus adapted to make an animation based on shape data related to a shape of an object, comprising deforming process means for deforming the object based on an input instruction which specifies deformation of the object, first attribute editing means for editing at least an attribute of the object, moving path editing means for editing a moving path of the object, first storage means for storing data used for making the animation, and second attribute editing means for automatically determining an attribute of a deformed object based on deformed shape data received from the deforming process means, where the deformed shape data are related to the shape of the deformed object. According to the animation editing apparatus of the present invention, the attribute of the deformed object is determined based on the shape data related to the deformed object. Hence, when forming an animation of an object whose attribute changes with the change in the shape, such as an animation which deforms rubber, cloth and the like, the attribute is automatically changed by the simple operation of changing the shape of the object. For this reason, the animation editing operation is facilitated and the operation efficiency is improved.

Other objects and further features of the present invention will be apparent from the following detailed description when read in conjunction with the accompanying drawings.

BRIEF DESCRIPTION OF THE DRAWINGS

FIG. 4 is a diagram showing an example of an attribute of an object;

FIG. 5 is a diagram showing the shape of the object before deformation;

FIG. 8 is a diagram showing the change in attribute with respect to the type of object and the change in shape;

FIG. 9 is a diagram showing the type of object under an item indicating the attribute of the object in FIG. 3;

FIG. 13 is a diagram showing a rectangular mesh representation of the object;

FIG. 16 is a diagram showing an example of shape data after the deformation;

DESCRIPTION OF THE PREFERRED EMBODIMENTS

First, a description will be given of the operating principle of the present invention, by referring to FIG. 2.

Figure 1:
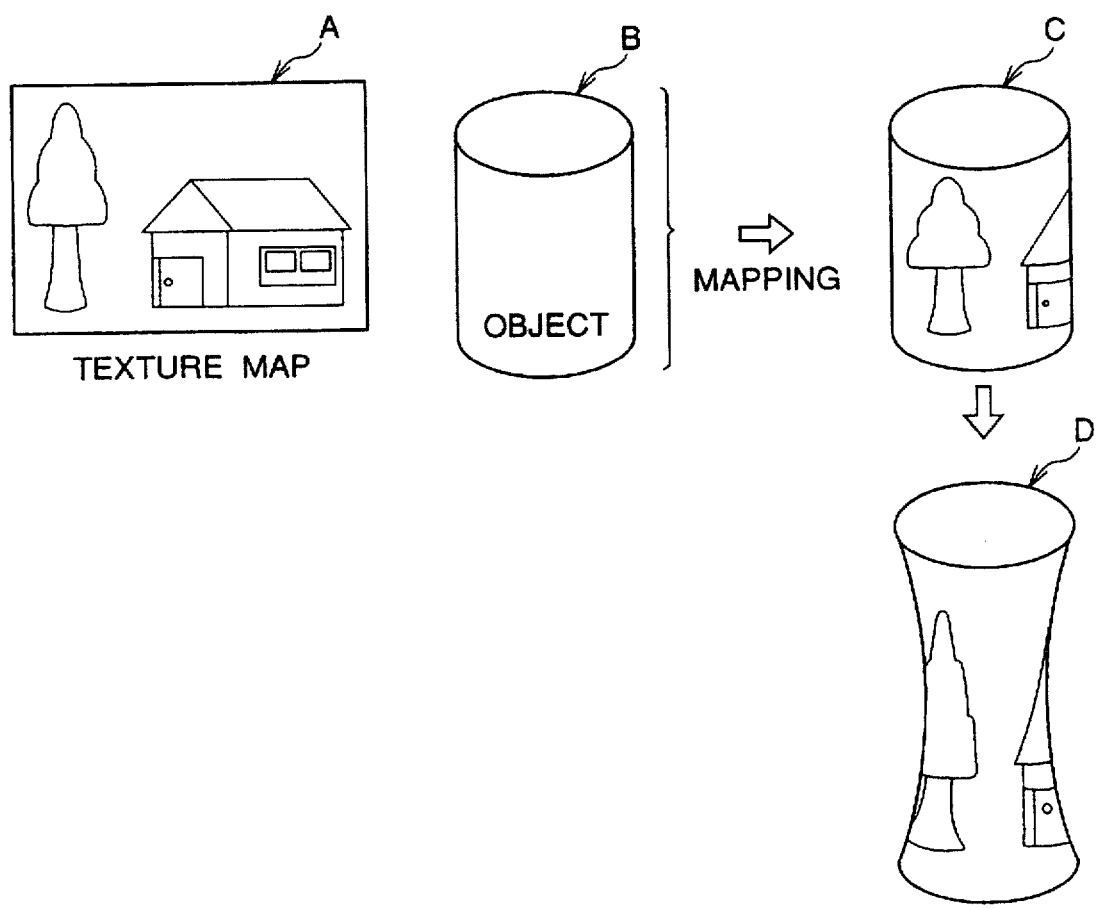
FIG. 1 is a diagram for explaining the concept of the mapping process.
Figure 2:
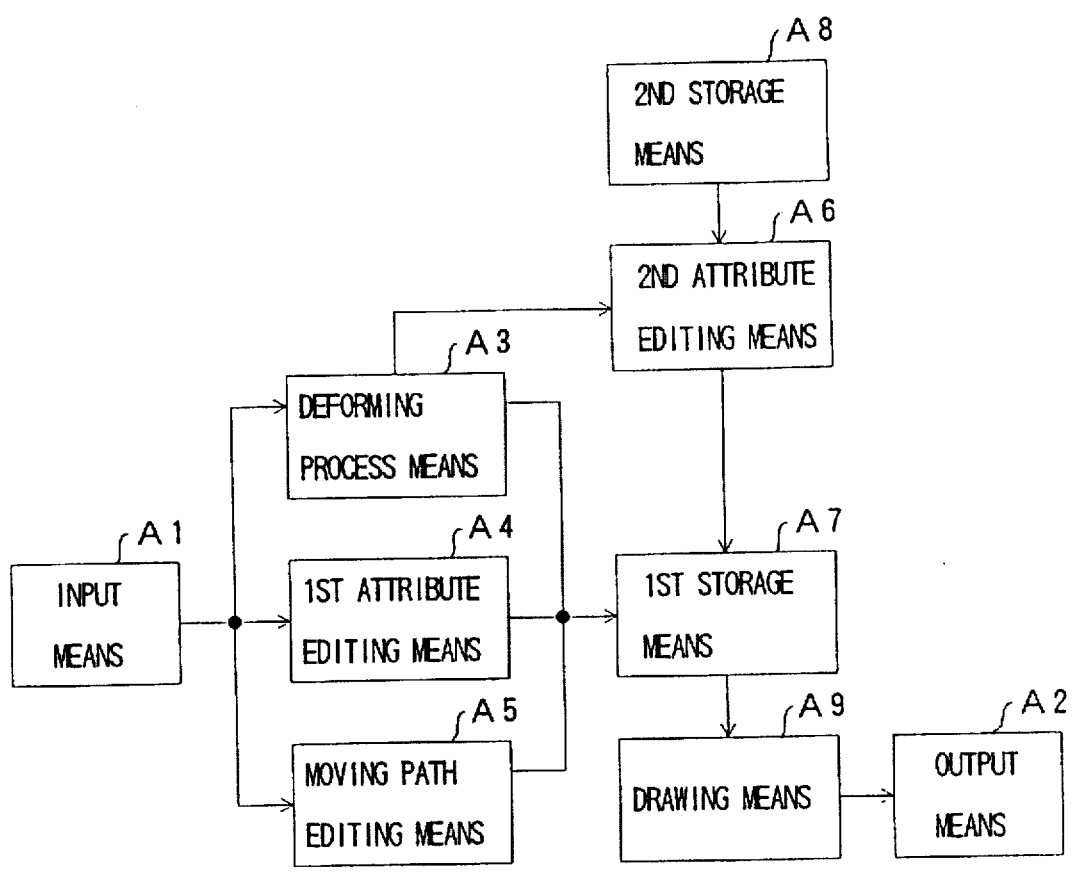
FIG. 2 is a system block diagram for explaining the operating principle of the present invention.

An animation editing apparatus shown in FIG. 2 includes an input means A1, a display means A2, a deforming process means A3, a first attribute editing means A4, a moving path editing means A5, a second attribute editing means A6, and a first storage means A7. This animation editing apparatus makes an animation based on shape data related to an object input from the input means A1, and displays the animation on the display means A2.

The deforming process means A3 deforms the object based on an instruction input from the input means A1. The first attribute editing means A4 edits an attribute of the object, and the moving path editing means A5 edits a moving path of the object. The first storage means A7 stores data for making the animation. The present invention is characterized by the second attribute editing means A6 which receives from the deforming process means A3 shape data related to the deformed object and determines the attribute which conforms to the shape of the deformed object based on the shape data.

According to the present invention, the attribute of the deformed object is determined based on the shape data related to the deformed object. Hence, when forming an animation of an object whose attribute changes with the change in the shape, such as an animation which deforms rubber, cloth and the like, the attribute is automatically changed by the simple operation of changing the shape of the object. For this reason, the animation editing operation is facilitated and the operation efficiency is improved.

The first attribute editing means A4 and the second attribute editing means A6 may be integrated into a single means. In this case, it is possible to simplify the construction of the animation editing apparatus.

It is also possible to additionally provide a drawing means A9 for carrying out a mapping process to put texture, that is, two or three dimensional image, on the surface of the object. In this case, based on the shape data related to the deformed object determined by the second attribute editing means A6, the drawing means A9 can carry out a process of changing the texture in correspondence with the shape data, and carry out the mapping process based on the changed texture. Hence, the attribute can be changed automatically by the simple operation of changing the shape of the object even for the mapping process. For this reason, the animation editing operation is facilitated and the operation efficiency is improved.

Furthermore, it is also possible to provide a second storage means A8 for storing category data which categorizes the contents of the change in the attribute accompanying the deformation of the object for each type of object. In this case, when the object is deformed, the second attribute editing means A6 determines the attribute of the deformed object depending on the deformed shape and type of object, based on the category data stored in the second storage means A8. Hence, the attribute is changed automatically also depending on the type of object, thereby facilitating the animation editing operation and improving the operation efficiency.

In addition, the category data stored in the second storage means A8 may be made editable by an input process from the input device A1. In this case, the present invention can be applied to various kinds of animation.

Figure 3:
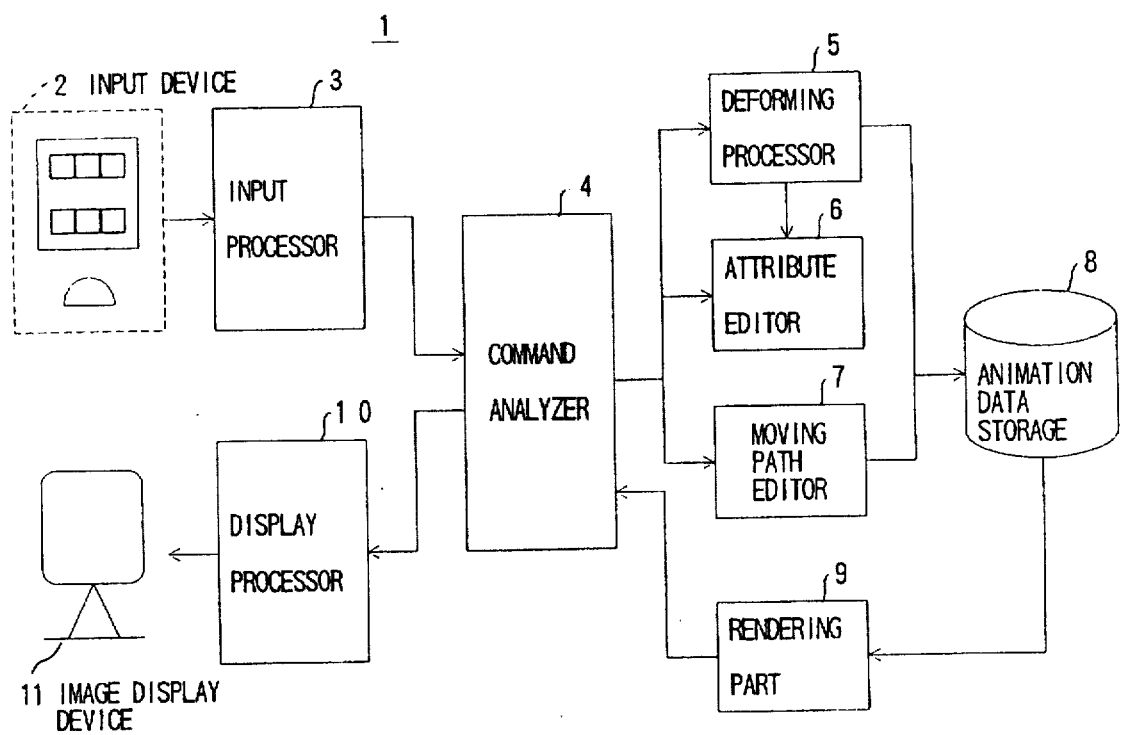
FIG. 3 is a system block diagram showing a first embodiment of an animation editing apparatus according to the present invention.

Next, a description will be given of a first embodiment of the animation editing apparatus of the present invention. FIG. 3 shows the first embodiment of the animation editing apparatus. A description will first be given of the general construction of this first embodiment.

In FIG. 3, an input device 2 of an animation editing apparatus 1 may be a keyboard or a pointing device such as a mouse which specifies a certain point on a display screen. Various data which are required when carrying out an animation editing process are input by an operator (editor) who carries out an input process using the input device 2. The various data input from the input device 2 are supplied to an input processor 3 which converts the various data into commands, and the commands are supplied to a command analyzer 4.

The command analyzer 4 analyzes the commands received from the input processor 3, and distributes processes corresponding to the commands to processors 5, 6 and 7 which will be described later. This command analyzer 4 is coupled to a deforming processor 5, an attribute editor 6, and a moving path editor 7.

The deforming processor 5 receives from the command analyzer 4 data for deforming an object, that is, changing the shape of the object. The deforming processor 5 carries out a deforming process to deform the object based on the data from the command analyzer 4. More particularly, the deforming processor 5 carries out a coordinate transformation process with respect to shape data related to the object before it is deformed and given in advance, and generates shape data related to the deformed object. The shape data related to the deformed object will hereinafter be referred to as "deformed shape data". The deformed shape data generated by the deforming processor 5 are stored in an animation data storage 8.

The attribute editor 6 receives from the command analyzer 4 editing data for editing the attribute of the object, and edits attribute data related to the object based on the editing data. In this embodiment, the attribute editor 8 also receives the deformed shape data generated by the deforming processor 5, independently of the editing data received from the command analyzer 4.

Based on the deformed shape data received from the deforming processor 5, the attribute editor 6 edits the attribute in accordance with the deformation of the object, so as to generate attribute data related to the deformed object. The attribute data related to the deformed object will hereinafter be referred to as "deformed attribute data". The deformed attribute data generated by the attribute editor 6 are stored in the animation data storage 8. The process of generating the deformed attribute data in the attribute editor 6 based on the deformed shape data received from the deforming processor 5 forms a Characterizing part of this embodiment, as will be described later.

The moving path editor 7 receives the editing data from the command analyzer 4 and generates moving path data by editing a moving path of the object based on the editing data. The moving path data generated by the moving path editor 7 is stored in the animation data storage 8.

As described above, the deforming processor 5, the attribute editor 6 and the moving path editor 7 are respectively coupled to the animation data storage 8. In addition, the deformed shape data generated by the deforming processor 5, the attribute data and the deformed attribute data generated by the attribute editor 6, and the moving path data generated by the moving path editor 7 are respectively stored in the animation data storage 8.

On the other hand, the animation data storage is coupled to a rendering part 9, and each of the data stored in the animation data storage 8 are supplied to the rendering part 9. This rendering part 9 carries out a process of making an image or animation based on the various data (deformed shape data, attribute data, deformed attribute data and moving path data) which are received from the animation data storage 8. Information (hereinafter referred to as animation data) related to the image or animation generated by the rendering part 9 is supplied from the rendering part 9 to the command analyzer 4.

When the animation data are received from the rendering part 9, the command analyzer 9 makes a display request with respect to a display processor 10 so as to request display of an image corresponding to the animation data. The display processor 10 carries out a display process depending on the display request received from the command analyzer 4, and an image display device 11 displays an image or animation depending on the display process of the display processor 10. The animation is edited by the above described series of processes of the animation editing apparatus.

Next, a description will be given of a process which is carried out by the animation editing apparatus 1 having the above described construction when deforming the object, that is, changing the shape of the object, in this first embodiment. In the following description, it is assumed for the sake of convenience that the animation editing apparatus 1 makes the animation of a three dimensional computer graphics.

It is assumed for the sake of convenience that data shown in FIG. 4 are related to an object O1 shown in FIG. 5. FIG. 5 shows a wire-frame display of the object O1 which is displayed on the image display device 11, and this object O1 has a spherical shape in this particular case. FIG. 5 shows the object O1 before it is deformed.

On the other hand, the data shown in FIG. 4 related to the object O1 are stored in the animation data storage 8. The data shown in FIG. 4 include shape data having a two dimensional arrangement of vertex coordinates of rectangular meshes which describe the object O1 shown in FIG. 5.

Figure 6:
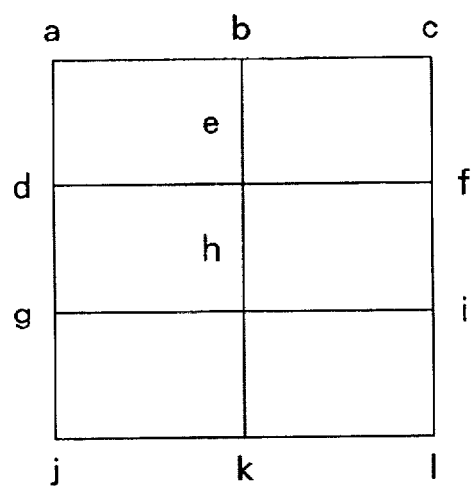
FIG. 6 is a diagram showing a rectangular mesh representation of the object.

FIG. 6 shows the relationship of the rectangular meshes and the data related to the vertex coordinates of the rectangular meshes. In the data shown in FIG. 4, attribute data include color as the attribute of the object O1. The attribute data have a two dimensional arrangement of the color, similarly to the shape data, in correspondence with each of the vertexes. The rendering part 9 which forms the image is designed to determine the color of each surface (or plane) by interpolating the colors of the vertexes based on these data.

A description will now be given of the process of the first embodiment when deforming the object O1 shown in FIG. 5, by referring to FIG. 7.

Figure 7:
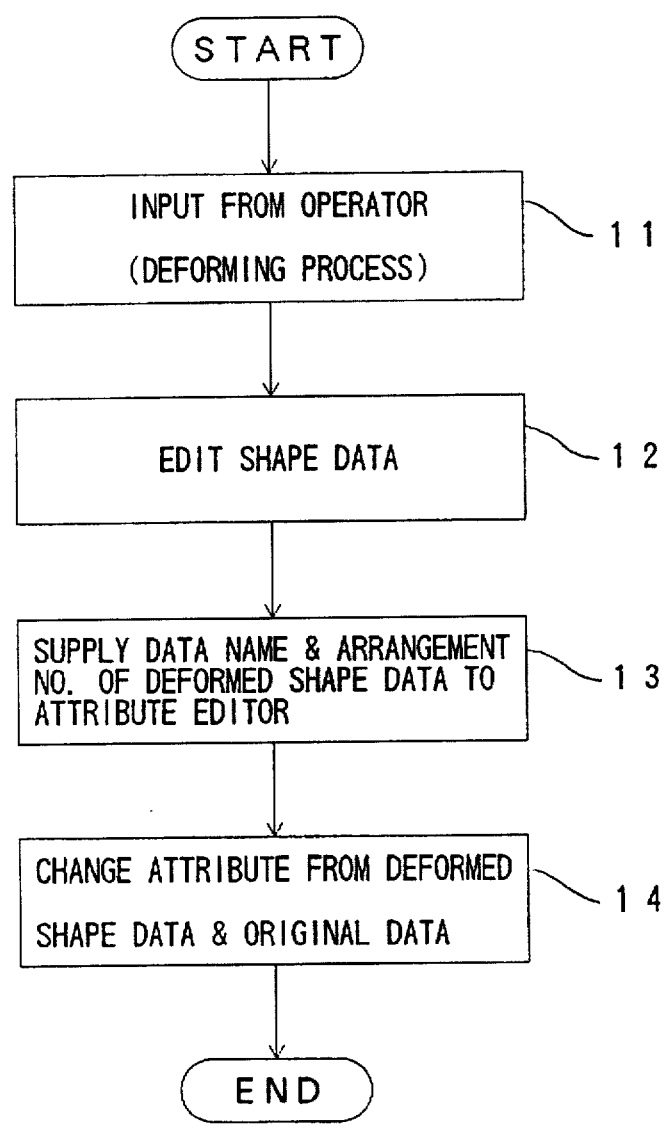
FIG. 7 is a flow chart for explaining a process of the first embodiment when deforming the object.

In a step 11 shown in FIG. 7, the operator (editor) carries out an input process. More particularly, the operator manipulates a keyboard, a pointing device or the like forming the input device 2 and instructs deformation of the object O1. This instruction is supplied to the command analyzer 4 via the input processor 3. The command analyzer recognizes that the contents of the instruction are related to deforming the object O1, and supplies commands related to the instruction contents to the deforming processor 5.

In a step 12, the deformed shape data related to the object O1 after it is deformed are formed from the input data input by the operator, and the deformed shaped data are stored in the animation data storage 8. This step 12 is carried out by the deforming processor 5. The deformed shape data formed by the deforming processor 5 are displayed on the image display device 11 via the rendering part 9, the command analyzer 4 and the display processor 10.

In a step 13, an arrangement number and data name of each vertex which moved from the original coordinate value by the deforming operation of the step 11 are supplied to the attribute editor 6. In other words, the deformed shape data formed by the deforming processor 5 are supplied from the deforming processor 5 to the attribute editor 6. The arrangement number of the vertex indicates the number which is arbitrarily assigned to each of the vertexes a, b, ..., k and l of the rectangular meshes shown in FIG. 6.

In a step 14, the attribute of each moved vertex and the attribute of each vertex adjacent to the moved vertex are calculated. This calculation of the attributes is made in the attribute editor 6. An example of a method of calculating the attributes of the vertexes will be described hereunder.

For the sake of convenience, it is assumed that the vertex h shown in FIG. 6 moved when the object O1 was deformed. In this case, the attribute of the vertex h and the attributes of the vertexes d, e, f, g, i, j and l which are adjacent to this vertex h are calculated. The attributes of the vertexes after the deformation are calculated based on the following formulas (1) and (2), where L denotes the brightness before the deformation satisfying $0.0 \leq L \leq 1.9$, L' denotes the brightness after the deformation satisfying $0.0 \leq L' \leq 1.0$, and "area" denotes a sum total of areas of surfaces including the vertexes.

$$\text{(area before deformation)} \cdot (1-L) = \text{(area after deformation)} \cdot (1-L') \quad (1)$$

$$L' = 1 - [\{(\text{area before deformation}) \cdot (1-L)\}/(\text{area after deformation})] \quad (2)$$

The image displayed on the image display device 11 becomes lighter (whitish) as the values of the brightnesses L and L' become closer to 1.0, and becomes darker (blackish) as the values of the brightnesses L and L' become closer to 0.0. Accordingly, as a result of deforming the object O1, a portion of the object O1 where the area expands (increases) is displayed in a color which is lighter (whitish) compared to the original color of this portion before the deformation, based on the formula (1) above. In addition, as a result of deforming the object O1, a portion of the object O1 where the area contracts (decreases) is displayed in a color which is darker (blackish) compared to the original color of this portion before the deformation. The calculated values of the attributes are stored in the animation data storage 8 and are reflected to the shape of the deformed object which is displayed on the image display device 11 via the rendering part 9, the command analyzer 4 and the display processor 10.

Therefore, according to this embodiment, the animation editing apparatus 1 automatically sets the attributes which suit the shape of the deformed object in response to the simple instruction input from the operator requesting deformation of the object. Hence, when making the animation of the object whose attributes change with the deformation of the object, such as an animation in which rubber, cloth or the like is deformed, the attributes are automatically changed by the simple operation of changing the shape of the object. For this reason, it is possible to facilitate the animation editing operation and also improve the operation efficiency.

Next, a description will be given of a second embodiment of the animation editing apparatus according to the present invention. In this second embodiment, data related to which attributes are to be changed and how the attributes are to be changed when the object is deformed are categorized depending on the type of object, and the attributes of the deformed object are changed depending on the characteristic of the object. In this second embodiment, the animation editing apparatus has the same construction as that shown in FIG. 3. For the sake of convenience, it is also assumed in this embodiment that the object O1 shown in FIG. 5 is deformed.

FIG. 8 shows the type of object and the changing contents of the attribute and depending on the deformation of the object. The changing contents of the attribute will hereinafter be referred to as attribute changing data. In addition, in this embodiment, the data related to the object O1 shown in FIG. 5 include attribute data shown in FIG. 9. The attribute data shown in FIG. 9 differ from the attribute data shown in FIG. 4 in that the attribute data in FIG. 9 additionally include the type of object.

A description will now be given of the process of the second embodiment when deforming the object O1 shown in FIG. 5, by referring to FIG. 10.

Figure 10:
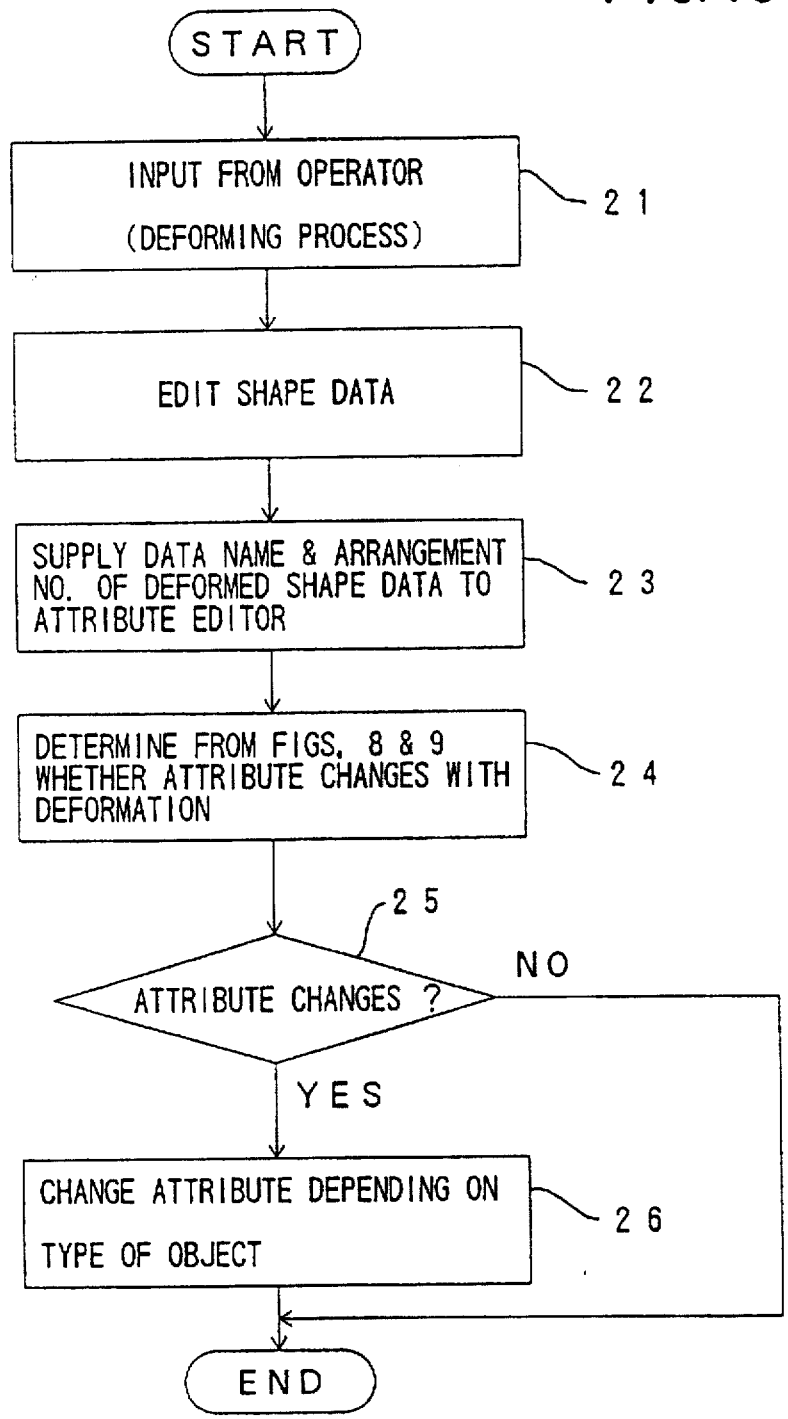
FIG. 10 is a flow chart for explaining a process of a second embodiment of the animation editing apparatus according to the present invention when deforming the object.

In a step 21 shown in FIG. 10, the operator (editor) carries out an input process. More particularly, the operator manipulates a keyboard, a pointing device or the like forming the input device 2 and instructs deformation of the object O1. This instruction is supplied to the command analyzer 4 via the input processor 3. The command analyzer 4 recognizes that the contents of the instruction are related to deforming the object O1, and supplies commands related to the instruction contents to the deforming processor 5.

In a step 22, the deformed shape data related to the object O1 after it is deformed are formed from the input data input by the operator, and the deformed shaped data are stored in the animation data storage 8. This step 22 is carried out by the deforming processor 5. The deformed shape data formed by the deforming processor 5 are displayed on the image display device 11 via the rendering part 9, the command analyzer 4 and the display processor 10.

In a step 23, an arrangement number and data name of each vertex which moved from the original coordinate value by the deforming operation of the step 21 are supplied to the attribute editor 6. In other words, the deformed shape data formed by the deforming processor 5 are supplied from the deforming processor 5 to the attribute editor 6.

In a step 24, the attribute data shown in FIG. 9 are retrieved from the data name, and a decision is made in a step 25 based on the contents of the attribute changing data shown in FIG. 8 and the type of object included the attribute data shown in FIG. 9 to determine whether or not the attributes of the deformed object should be changed. This decision to determine whether or not the attributes of the deformed object should be changed is carried out by the attribute editor 6 shown in FIG. 3. If the attributes of the deformed object should be changed and the decision result in the step 25 is YES, the process advances to a step 26.

In the step 26, the method of changing the attribute is retrieved from the attribute changing data shown in FIG. 8, and the attribute is edited. More particularly, the type of object included in the attribute data shown in FIG. 9 is "rubber", and this "rubber" is retrieved from the column containing the type of object which is stored as the attribute changing data in FIG. 8. In addition, an editing process is carried out based on the method of changing the attribute after the deformation, which is stored under the column "rubber", that is, based on the method of "changing the surface color depending on the area". The results of this editing process are stored in the animation data storage 8 as the deformed attribute values. This editing process of this step 26 is carried out by the attribute editor 6.

On the other hand, the process ends if the attributes of the deformed object should not be changed and the decision result in the step 25 is NO. In this case, the attribute of the deformed object is not changed.

According to this second embodiment described above, it is possible to change the attributes depending on the type of object. As a result, the animation editing operation is even more facilitated, and the operation efficiency is also improved.

In the second embodiment, it is possible to make the attribute changing data shown in FIG. 8 editable by the operator. By providing the function of editing (adding and deleting) the attribute changing data in the second embodiment, the change in the attribute in accordance with the deformation of the object may be made to suit the operator's demands.

Next, a description will be given of a third embodiment of the animation editing apparatus according to the present invention. In this third embodiment, the attributes are automatically changed by changing the shape of the object in an animation editing apparatus which has a function of carrying out a mapping process. In this third embodiment, the construction of the animation editing apparatus is the same as that shown in FIG. 3. However, some of the functions of the constituent elements shown in FIG. 3 are different from those of the first and second embodiment. Hence, a description will first be given of the constituent elements of the animation editing apparatus having the different functions.

In this third embodiment, the attribute editor 6 receives a notification related to the deformation and calculates the deformed shape data (data indicating the area ratio) from the shape data which are related to the object before and after the deformation and are stored in the animation data storage 8. The calculated deformed shape data are stored in the animation data storage 8.

The animation data storage 8 in this embodiment stores the shape data related to the object, the attribute data which include mapping data as one of the attributes, the path data related to the position of the object, and deforming data which are used when carrying out the mapping process.

The rendering part 9 has the function of forming the animation based on the data stored in the animation data storage 8, as described above. In addition, the mapping process which puts texture with respect to the object is carried out by this rendering part 9. According to the conventional mapping process, the texture associated with the object is put on the object with the attribute before the deformation. But in this third embodiment, the mapping process puts the texture on the object after reflecting the deformed shape data in the texture. The mapping process of this embodiment will be described hereunder.

Figures 11, 12:
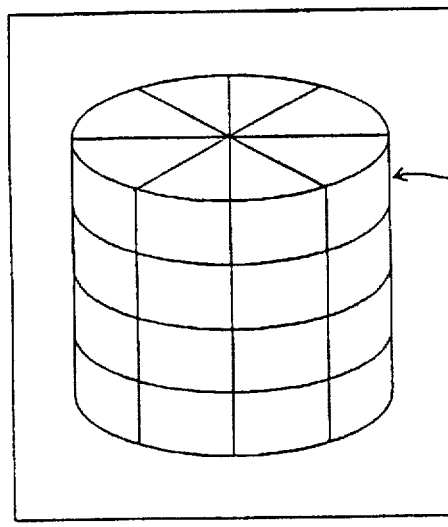
FIG. 11 is a diagram showing a displayed object.
FIG. 12 is an example showing an example of an attribute of the object.

For the sake of convenience, it is assumed that an object O2 having the shape shown in FIG. 11 before the deformation is to be edited. FIG. 11 shows a wire-frame display of the object O2 on the image display device 11. The object O2 has a cylindrical shape in this particular case. It is also assumed that the data related to the object O2 are as shown in FIG. 12. The data shown in FIG. 12 are stored in the animation data storage 8.

As shown in FIG. 12, the shape data and normal vector data are prescribed as the attribute data in this embodiment. The data shown in FIG. 12 include shape data having a two dimensional arrangement of vertex coordinates of rectangular meshes which describe the object O2 shown in FIG. 11.

FIG. 13 shows the relationship of the rectangular meshes and the data related to the vertex coordinates of the rectangular meshes. As shown in FIG. 13, the rectangular mesh representation of the object O2 includes 6 rectangular meshes, and 4×3 (a, b, . . . , l) vertexes of the meshes exist. Hence, the vertex coordinates of 12 vertexes a, b, . . . , l are stored in the animation data storage 8 as the shape data.

In addition, the data shown in FIG. 12 include the normal vector data indicating the direction of each of the vertexes a, b, . . . , l of the rectangular meshes. The normal vector data are associated with each of the vertexes a, b, . . . , l and have a two dimensional arrangement, similarly to the shape data. The normal vectors are used during the so-called bump mapping process. By using the normal vectors, it becomes possible to describe the small unevenness of the object by shading, so that a surface having a complex unevenness or irregularity can be displayed artificially.

Figure 14:
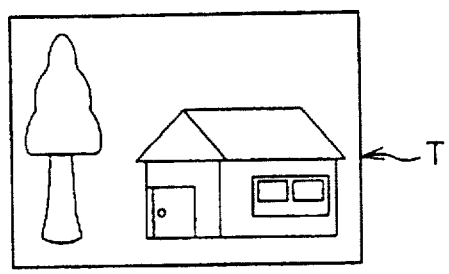
FIG. 14 is a diagram showing an example of a texture.

Furthermore, it is assumed that the animation data storage 8 also stores a texture T shown in FIG. 14 as the image to be mapped on the object O2 shown in FIG. 11, and associating data for associating the texture T and the object O2. When the rending part carries out the mapping process, the surface of the object O2 is added with the attribute, that colored, for example, based on the texture T and the associating data.

A description will now be given of the process of the third embodiment when deforming the object O2 shown in FIG. 11, by referring to FIG. 15.

Figure 15:
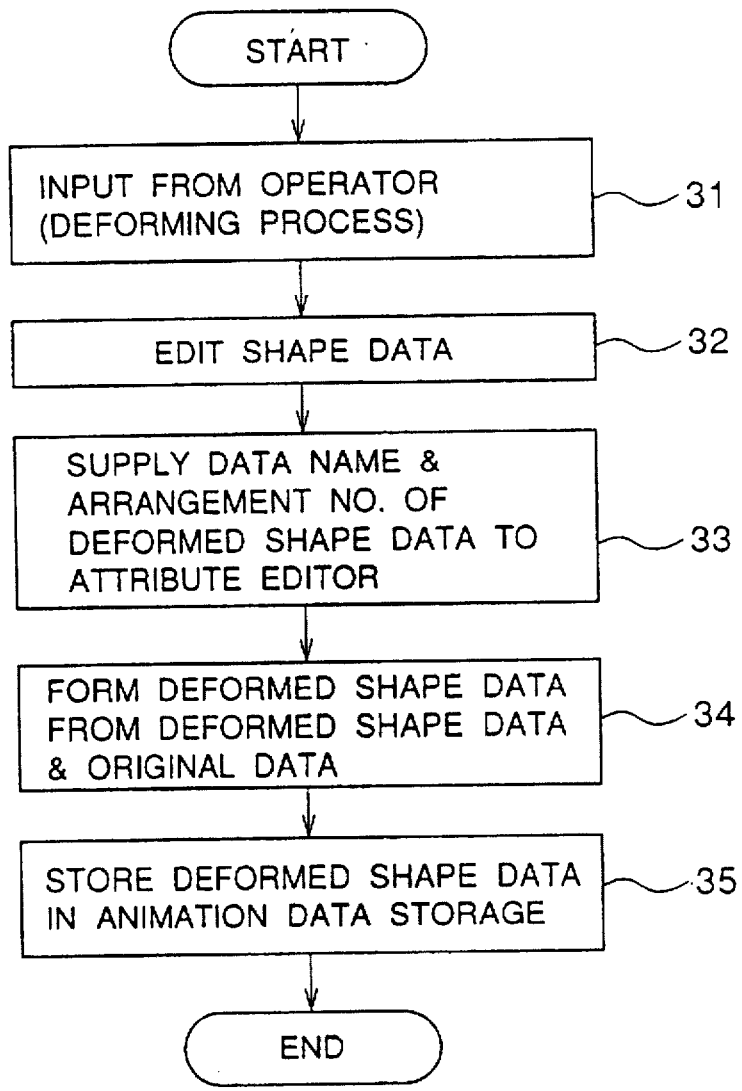
FIG. 15 is a flow chart for explaining a process of a third embodiment of the animation editing apparatus according to the present invention when deforming the object.

In a step 31 shown in FIG. 15, the operator (editor) carries out an input process. More particularly, the operator manipulates a keyboard, a pointing device or the like forming the input device 2 and instructs deformation of the object O2. This instruction is supplied to the command analyzer 4 via the input processor 3. The command analyzer 4 recognizes that the contents of the instruction are related to deforming the object O2, and supplies commands related to the instruction contents to the deforming processor 5.

In a step 32, the deformed shape data related to the object O2 after it is deformed are formed from the input data input by the operator, and the deformed shaped data are stored in the animation data storage 8. This step 32 is carried out by the deforming processor 5. The deformed shape data formed by the deforming processor 5 are displayed on the image display device 11 via the rendering part 9, the command analyzer 4 and the display processor 10.

In a step 33, an arrangement number and data name of each vertex which moved from the original coordinate value by the deforming operation of the step 31 are supplied to the attribute editor 6. In other words, the deformed shape data formed by the deforming processor 5 are supplied from the deforming processor 5 to the attribute editor 6. The arrangement number of the vertex indicates the number which is arbitrarily assigned to each of the vertexes a, b, . . . , k and l of the rectangular meshes shown in FIG. 13.

In a step 34, the area ratio between the areas including the moved vertex before and after the deformation of the meshes is calculated from the following formula (3) in the attribute editor 6 for each moved vertex.

(area ratio)=(mesh area after deformation)/(mesh area before deformation)  (3)

As may be seen from the formula (3) above, the area ratio increases as the meshes are deformed and the mesh areas increase. In this embodiment, the value of the area ratio obtained from the formula (3) will be referred to as the deformed shape data. In addition, the deformed shape data related to the mesh which includes no moved point is regarded as being "1".

Figure 16:
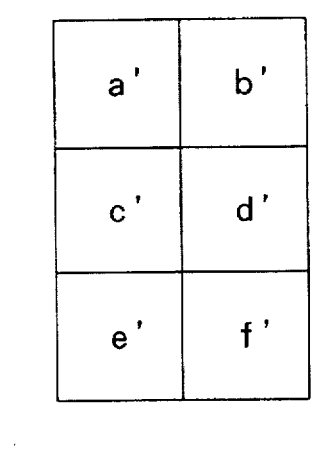

In a step 35, the attribute editor 6 stores the deformed shape data obtained in the step 34 into the animation data storage 8. FIG. 16 shows the deformed shape data corresponding to the shape data shown in FIG. 12. As shown in FIG. 16, the deformed shape data include 3×2 data because there are 3×2 meshes, and each of the deformed shape data a', b', . . . , f' shown in FIG. 16 are arranged in a 3×2 arrangement. The deformed shape data a', b', . . . , f' which are generated in the above described manner in the above arrangement are stored in the animation data storage 8.

Figure 17:
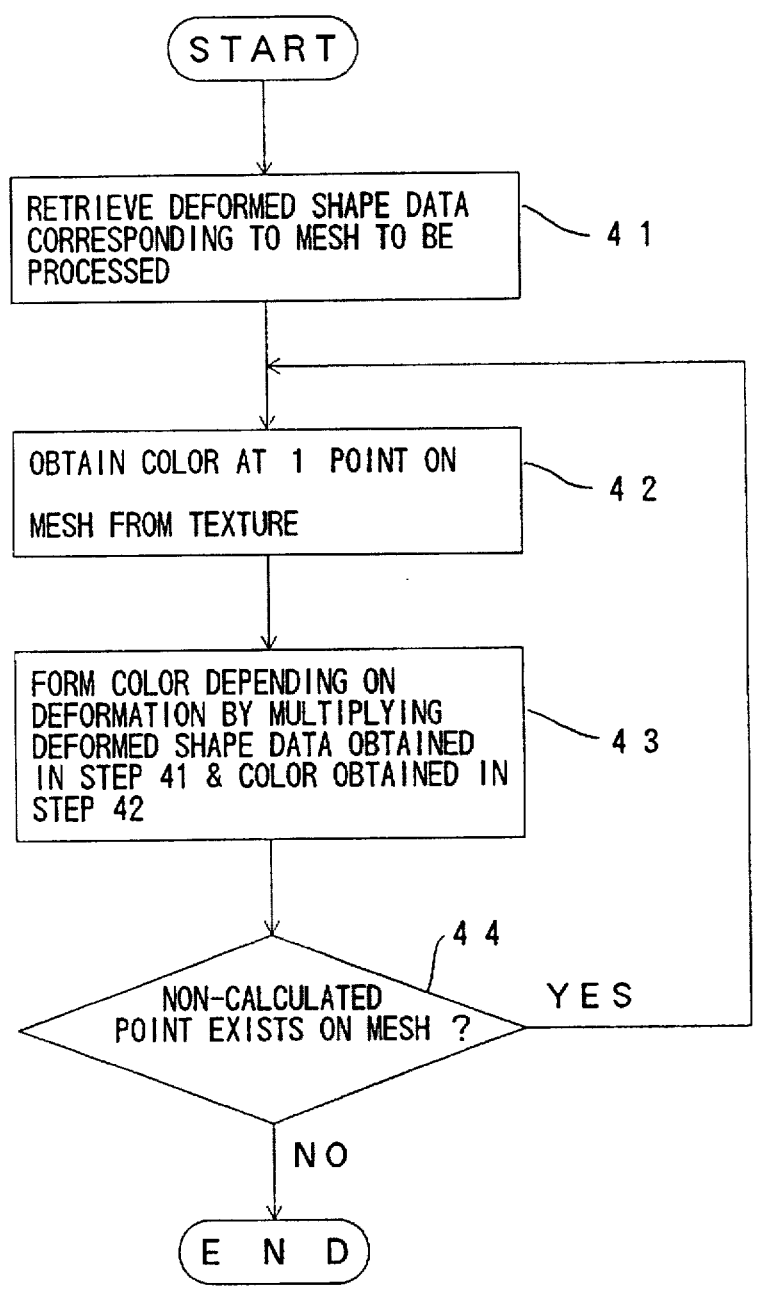
FIG. 17 is a flow chart for explaining a mapping process of a rendering part of the third embodiment when deforming the object.

Next, a description will be given of the mapping process which is carried out by the rendering part 9, by referring to FIG. 17. FIG. 17 shows the mapping process with respect to 1 mesh, that is, with respect to 1 mesh a' shown in FIG. 16, for example. Accordingly, the mapping process shown in FIG. 17 is repeated with respect to all of the meshes a', b', . . . , f' so as to carry out the mapping process with respect to the entire mesh representation of the object O2.

In FIG. 17, a step 41 retrieves the deformed shape data related to a mesh (for example, the mesh a') which is to be processed, from the deformed shape data shown in FIG. 16 stored in the animation data storage 8, based on the arrangement number of the mesh. In a step 42, the color of 1 point on the mesh which is to be processed is retrieved, from the texture stored in the animation data storage 8, based on the retrieved deformed shape data.

In a step 43 which characterizes this embodiment, the deformed shape data obtained in the step 41 is multiplied to the color obtained in the step 42, so as to make a color associated with the deformed object. Conventionally, the color obtained in the step 42 is directly described on the object without making such an operation, and this is the reason why the color (attribute) associated with the deformation could not be described conventionally. In order to describe the color associated with the deformation, it was conventionally necessary for the operator to carry out an input process from the input device so as to instruct the animation editing apparatus.

The operation of calculating the particular color the step 43 can be made according to the following formula (4), where L denotes the brightness before the deformation and satisfies $0.0 \leq L \leq 1.0$, and L' denotes the brightness after the deformation and satisfies $0.0 \leq L' \leq 1.0$.

$$L'=L \cdot (\text{deformed shape data}) \quad (4)$$

The image displayed on the image display device 11 becomes lighter (whitish) as the values of the brightnesses L and L' become closer to 1.0, and becomes darker (blackish) as the values of the brightnesses L and L' become closer to 0.0. Accordingly, as a result of deforming the object O2, a portion of the object O2 where the area expands (increases) is displayed in a color which is lighter (whitish) compared to the original color of this portion before the deformation, based on the formulas (3) and (4) above. In addition, as a result of deforming the object O2, a portion of the object O2 where the area contracts (decreases) is displayed in a color which is darker (blackish) compared to the original color of this portion before the deformation. The calculated values of the attributes (that is, colors) are stored in the animation data storage 8 and are reflected to the shape of the deformed object which is displayed on the image display device 11 via the rendering part 9, the command analyzer 4 and the display processor 10.

Therefore, according to this embodiment, the animation editing apparatus 1 automatically sets the attributes which suit the shape of the deformed object in response to the simple instruction input from the operator requesting deformation of the object. Hence, when making the animation of the object whose attributes change with the deformation of the object, such as an animation in which rubber, cloth or the like is deformed, the attributes are automatically changed by the simple operation of changing the shape of the object. For this reason, it is possible to facilitate the animation editing operation and also improve the operation efficiency.

In a step 44 shown in FIG. 17, a decision is made to determine whether or not a non-calculated point exist on the meshes. The mapping process ends if the decision result in the step 44 is NO, but the process returns to the step 41 if the decision result in the step 44 is YES. As a result, the steps 41 through 43 are repeated until the calculation is completed for all of the meshes.

Next, a description will now be given of the process of a fourth embodiment of the animation editing apparatus according to the present invention when deforming the object. In this fourth embodiment, the animation editing apparatus has the same construction as that shown in FIG. 3. For the sake of convenience, it is also assumed in this embodiment that the object O2 shown in FIG. 11 is deformed.

According to this fourth embodiment, the attribute is automatically changed by deforming the object in the animation editing apparatus having a function of carrying out a bump mapping process as the mapping process.

The bump mapping process is the process of shading the object by putting unevenness on the object surface. First, a general description will be given of this bump mapping process. In the bump mapping process, black-and-white texture or the like of the original data to be mapped is associated with the shape of the object, and the normal vector at a certain point on the object is obtained from the value of the associated texture. For example, even if the object to be mapped is a plane, it is possible to describe a portion which receives more light and a portion which receives less light by changing the length of the normal vector on the plane. As a result, the unevenness can be described artificially on the object surface.

Figure 18:
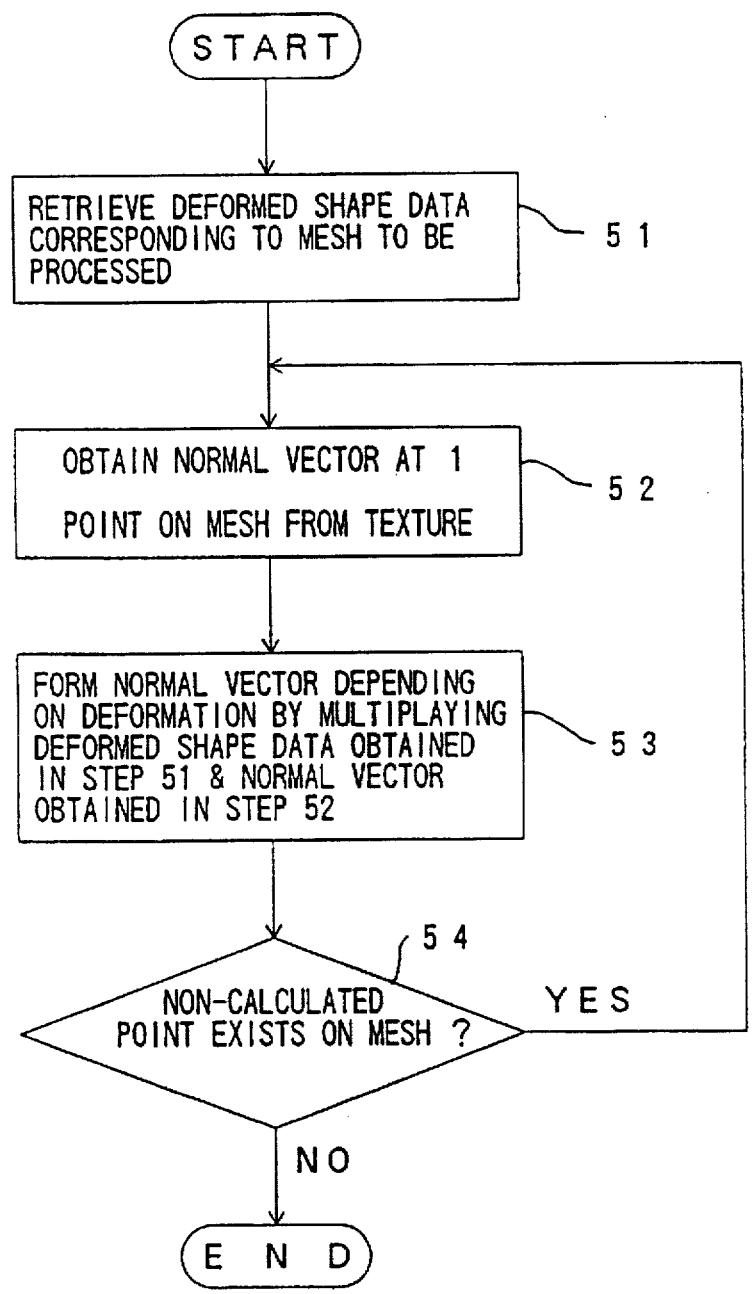
FIG. 18 is a flow chart for explaining a mapping process of a rendering part of a fourth embodiment of the animation editing apparatus according to the present invention when deforming the object.

A description will now be given of the bump mapping process which is carried out by the rendering part 9 in this embodiment, by referring to FIG. 18. FIG. 18 shows the bump mapping process which is carried out with respect to 1 mesh.

In FIG. 18, a step 51 retrieves the deformed shape data related to a mesh (for example, the mesh a') which is to be processed, from the deformed shape data shown in FIG. 16 stored in the animation data storage 8, based on the arrangement number of the mesh. In a step 52, the normal vector at a point on the mesh which is to be processed is retrieved from the texture stored in the animation data storage B, based on the retrieved deformed shape data.

In a step 53 which characterizes this embodiment, the deformed shape data obtained in the step 51 is multiplied to the normal vector obtained in the step 52, so as to form a normal vector associated with the deformed object. More particularly, the normal vector of the deformed object is calculated from the following formula (5), where H denotes the length of the normal vector before the deformation and H' denotes the length of the normal vector after the deformation.

$$H'=H \cdot (\text{deformed shape data}) \quad (5)$$

As described above, H and H' are the lengths of the normal vectors. Hence, the unevenness is described as being large when the length of the normal vector is long because more light is received in this case. On the other hand, the unevenness is described as being small and smooth when the length of the normal vector is short because less light is received in this Accordingly, as a result of deforming the object O2, a portion of the object O2 where the area expands (increases) is displayed with an unevenness which is smaller (smoother) compared to the original unevenness of this portion before the deformation, based on the formulas (3) and (5) above. In addition, as a result of deforming the object O2, a portion of the object O2 where the area contracts (decreases) is displayed with an unevenness which is larger compared to the original unevenness of this portion before the deformation. The calculated values of the attributes (that is, lengths of the normal vectors) are stored in the animation data storage 8 and are reflected to the shape of the deformed object which is displayed on the image display device 11 via the rendering part 9, the command analyzer 4 and the display processor 10.

Therefore, according to this embodiment, it is possible to facilitate the animation editing operation and improve the operation efficiency in the animation editing apparatus 1 which has the function of carrying out the bump mapping process.

In a step 54 shown in FIG. 18, a decision is made to determine whether or not a non-calculated point exist on the meshes. The bump mapping process ends if the decision result in the step 54 is NO, but the process returns to the step 51 if the decision result in the step 54 is YES. As a result, the steps 51 through 53 are repeated until the calculation is completed for all of the meshes.

Next, a description will now be given of the process of a fifth embodiment of the animation editing apparatus according to the present invention when deforming the object. In this fifth embodiment, the animation editing apparatus has the same construction as that shown in FIG. 3.

According to this fifth embodiment, data related to how the attributes (color, unevenness and the like) which are added by the mapping process are to be changed when the object is deformed are categorized in advance depending on the type of object. Hence, it is possible to carry out a mapping process depending on the characteristic of the object after the deformation of the object.

Figure 19:
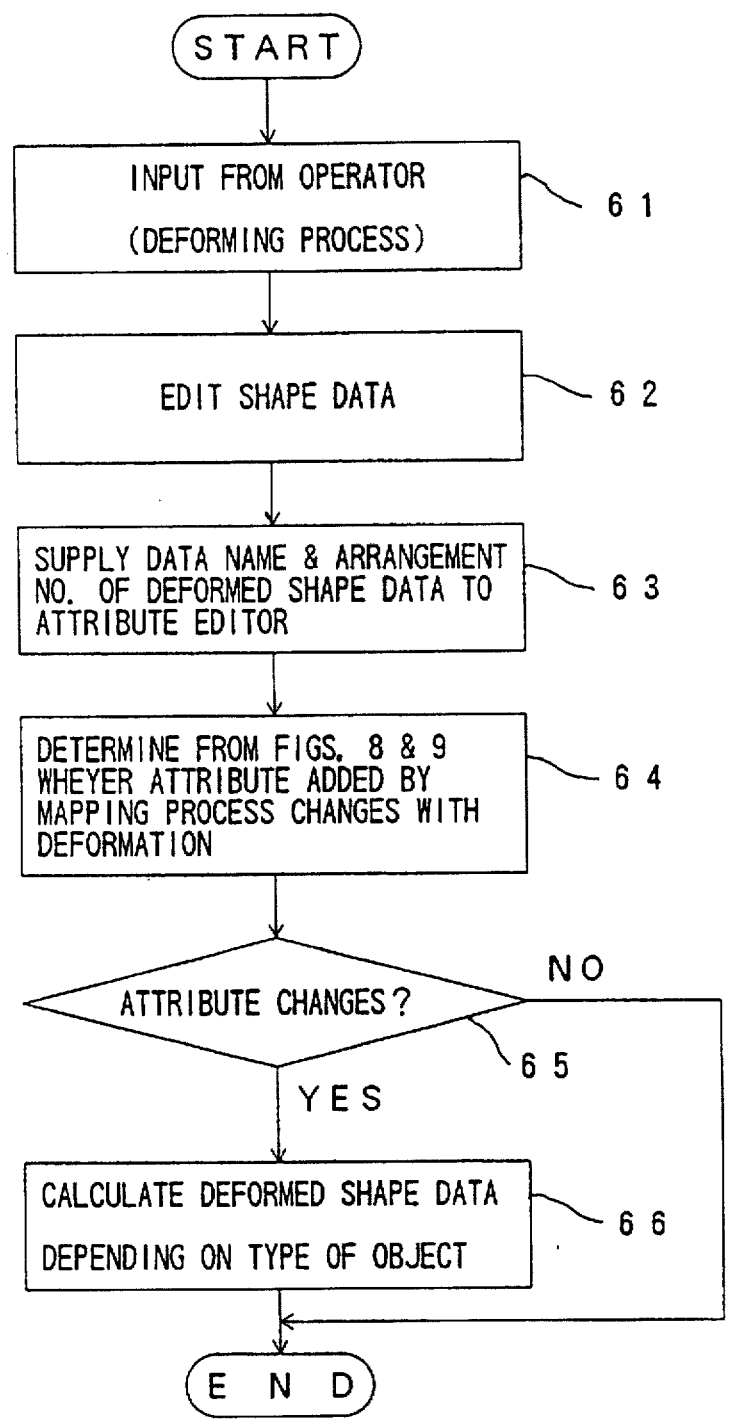
FIG. 19 is a flow chart for explaining a process of a fifth embodiment of the animation editing apparatus according to the present invention when deforming the object.

FIG. 19 shows the process carried out by this fifth embodiment when deforming the object, that is, the changing contents of the mapping depending on the type of object and the deformation. In this embodiment, it is assumed that the data shown in FIGS. 8 and 9 are included in the attribute data. In FIG. 19, steps 61 through 63 are the same as the steps 31 through 33 shown in FIG. 15, and a description thereof will be omitted. A description will be given from a step 64.

In the step 64, the attribute editor 6 retrieves the attribute data shown in FIG. 9 from the data name. In a step 65, the attribute editor 6 decides whether or not the attribute (color, unevenness and the like) with respect to the deformed object, based on the contents of the attribute changing data shown in FIG. 8 and the type of object included in the attribute data shown in FIG. 9. The process advances to a step 66 if the attribute is to be changed and the decision result in the step 65 is YES.

In the step 66, the attribute editor 6 retrieves the method of changing the attribute based on the attribute changing data shown in FIG. 8, and edits the attribute. More particularly, since the type of object included in the attribute data shown in FIG. 9 is "rubber" in this particular case, and this "rubber" is retrieved from the column containing the type of object which is stored as the attribute changing data in FIG. 8. In addition, an editing process is carried out based on the method of changing the attribute after the deformation, which is stored under the column "rubber", that is, based on the method of "changing the surface color depending on the area". The results of this editing process are stored in the animation data storage 8 as the deformed attribute values. This editing process of this step 26 is carried out by the attribute editor 6.

On the other hand, the process ends if the attributes should not be changed and the decision result in the step 65 is NO. In this case, the attribute of the deformed object is not changed.

Next, a description will be given of a mapping process which is carried out by the rendering part 9 in this fifth embodiment, by referring to FIG. 20.

Figure 20:
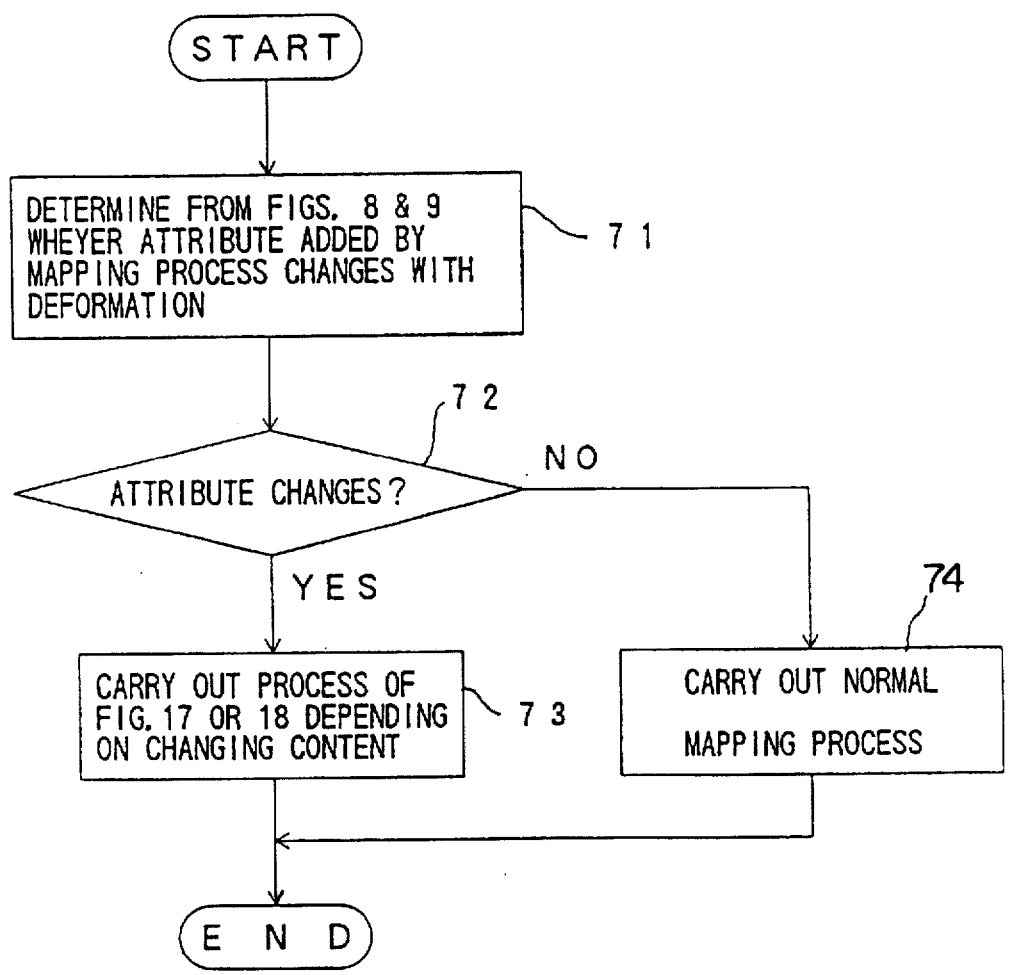
FIG. 20 is a flow chart for explaining a mapping process of a rendering part of the fifth embodiment when deforming the object.

In a step 71 shown in FIG. 20, FIG. 9 is retrieved from the data name. In a step 72, a decision is made based on FIG. 8 and the type of object shown in FIG. 9 to determine whether or not the attribute which is added to the deformed object should be changed. The steps 71 and 72 are carried out by the attribute editor 6.

If the attribute is to be changed and the decision result in the step 72 is YES, the process advances to a step 73. In the step 73, the process of the third embodiment described above in conjunction with FIG. 17 or the process of the fourth embodiment described above in conjunction with FIG. 18 is carried out based on the changing contents. On the other hand, if the attribute is not to be changed and the decision result in the step 72 is NO, the process advances to a step 74. In the step 74, a normal mapping process which does not change the attribute depending on the deformation of the object is carried out, because there is no need to carry out the process peculiar to the present invention. The process ends after the step 73 or 74. By the process described above, it is possible to automatically carry out the mapping process depending on the type of object.

Of course, it is possible to add the function of editing the data shown in FIG. 8 in this fifth embodiment. In this case, it becomes possible to add and delete the data shown in FIG. 8, thereby enabling the mapping process which accompanies the deformation of the object to be customized to suit the demands of the operator.

Further, the present invention is not limited to these embodiments, but various variations and modifications may be made without departing from the scope of the present invention.

What is claimed is:

1. An animation editing apparatus for editing an animation based on shape data related to a shape of a three-dimensional object, said animation editing apparatus comprising:

deforming process means for deforming the object based on an input instruction which specifies deformation of the object;

first attribute editing means for editing at least an attribute of the object;

moving path editing means for editing a moving path of the object;

storage means for storing data which describe changing content of the attribute depending on the deformation of the object and are categorized for each type of object; and second attribute editing means for automatically determining an attribute of a deformed object based on deformed shape data received from said deforming process means, said deformed shape data describing the shape of the deformed object, said second attribute editing means determining the attribute depending upon the shape and type of the object after the deformation when the object is deformed, based upon the data stored in the storage means.

2. The animation editing apparatus as claimed in claim 1, which further comprises:

input means for inputting the shape data describing the object before the deformation and for inputting the input instruction.

3. The animation editing apparatus as claimed in claim 1, wherein said first attribute editing means and said second attribute editing means are formed by a single processor means.

4. The animation editing apparatus as claimed in claim 1, which further comprises:

drawing means for carrying out a mapping process which puts texture on a surface of the object, said texture being a two or three dimensional image.

5. The animation editing apparatus as claimed in claim 4, wherein said drawing means includes means for changing the texture associated with the shape data based on the deformed shape data obtained in said second attribute editing means and for carrying out the mapping process based on the changed texture.

6. The animation editing apparatus as claimed in claim 1, which further comprises:

input means for inputting the shape data describing the object before the deformation and for inputting the input instruction.

7. The animation editing apparatus as claimed in claim 6, wherein said input means includes means for editing the data stored in said storage means.

8. The animation editing apparatus as claimed in claim 1, which further comprises:

display-means for displaying the deformed object obtained in said deforming process means with the attribute determined in said second attribute editing means.

9. An animation editing apparatus as recited in claim 1, wherein the attribute is an aspect of a surface of an image, said apparatus further comprising drawing means for changing the surface of the image on a display based upon output from said first attribute editing means and said second attribute editing means, said drawing means changing a color of said surface based upon the shape of the deformed object.

10. An animation editing apparatus as recited in claim 1, wherein the attributes is an aspect of a surface of an image, said apparatus further comprising drawing means for changing the surface of the image on a display based upon output from said first attribute editing means and said second attribute editing means, said drawing means changing a texture of said surface based upon the shape of the deformed object.

11. An animation editing apparatus as recited in claim 1, wherein the attributes is an aspect of a surface of an image, said apparatus further comprising drawing means for changing the surface of the image on a display based upon output from said first attribute editing means and said second attribute editing means, said drawing means changing a pattern size of said surface based upon the shape of the deformed object.

12. An animation editing apparatus for editing an animation based on shape data related to a shape of a three-dimensional object, said animation editing apparatus comprising:

deforming process means for deforming the object based on an input instruction which specifies deformation of the object;

first attribute editing means for editing at least an attribute of the object;

moving path editing means for editing a moving path of the object;

storage means for storing data which describe changing content of the attribute depending on the deformation of the object and are categorized for each type of object; and second attribute editing means for automatically determining an attribute of a deformed object based on deformed shape data received from said deforming process means, said deformed shape data describing the shape of the deformed object; and drawing means for carrying out a mapping process which puts texture on a surface of the object, said texture being a two or three dimensional image, said drawing means including means for changing the texture associated with the shape data based upon the deformed shape data obtained in the second attribute editing means and for carrying out the mapping process based upon the changed texture.

13. The animation editing apparatus as claimed in claim 12, wherein said second attribute editing means determines the attribute depending on the shape and type of the object after the deformation when the object is deformed, based on the data stored in said storage means.

* * * * *